ROBERT G. WHITE,
INVENTOR.

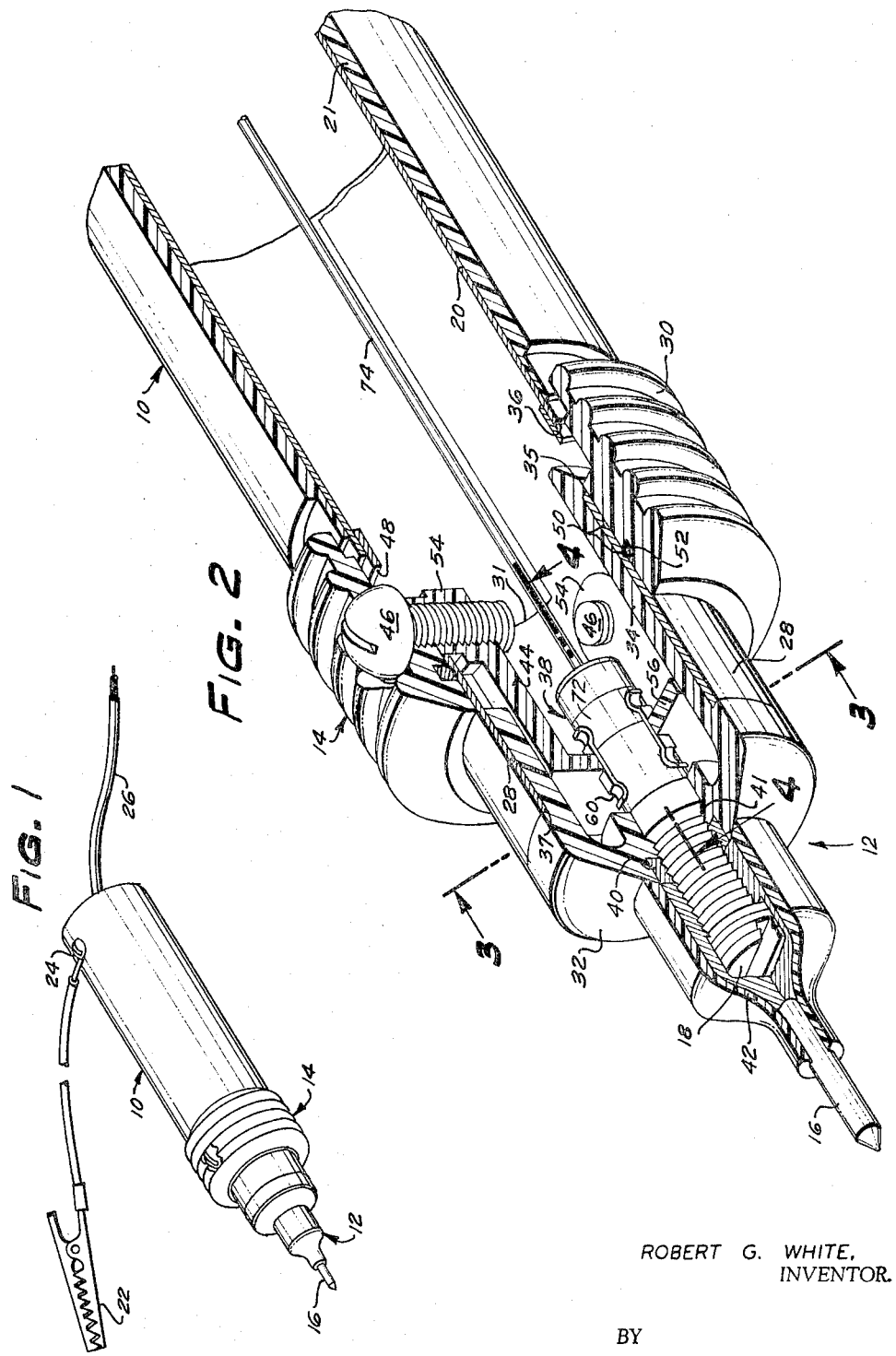
ROBERT G. WHITE,
INVENTOR.
BY
BUCKHORN, CHEATHAM & BLORE
ATTORNEYS

BY

BUCKHORN, CHEATHAM & BLORE
ATTORNEYS 3,283,248
ELECTRICAL PROBE CONTAINING A CAPACITOR AND A SWITCH ASSEMBLY FOR SELECTIVELY SHORT CIRCUITING SUCH CAPACITOR
Robert G. White, Portland, Oreg., assignor to Tektronix, Inc., Beaverton, Oreg., a corporation of Oregon
Filed Sept. 24, 1962, Ser. No. 225,631
6 Claims. (Cl. 324—72.5)

The subject matter of the present invention relates generally to electrical probes for measuring the voltage or current characteristics of electrical circuits or other apparatus, and in particular, to probes having a switch mechanism formed integrally therewith for changing the electrical connections of the inner conductor of such probe between an A.C. switch position in which such inner conductor is effectively connected in series with a blocking capacitor mounted within such probe, and a D.C. switch position in which such capacitor is short circuited so that such inner conductor is connected directly to the measuring instrument.

The electrical probe and switch assembly of the present invention is especially useful in transmitting a vertical input signal to the vertical deflection input terminal of a high frequency cathode ray oscilloscope. The probe and switch assembly may be attached to a coaxial cable which is electrically connected to the input terminal of the vertical preamplifier of such oscilloscope. During measurement the probe tip is placed in contact with the circuit under test to transmit electrical signals from such circuit to the input terminal of the preamplifier without substantially distorting the shape of such signals. By employing a blocking capacitor of tubular ceramic construction with its conducting elements exposed and locating such capacitor inside the probe body adjacent the probe tip, such capacitor may function as part of the switch mechanism for the probe so that the conducting elements of such capacitor are directly engaged by the movable switch contacts when the switch is moved between its A.C. and D.C. switch positions. This arrangement allows shorter lead lengths for the switch and capacitor, thereby resulting in a better high frequency response than conventional probe and switch combinations. Another advantage of the electrical probe and switch assembly of the present invention is that it has a simplified and rugged construction which is easily assembled or repaired in less time than conventional probes. Also, since the conducting elements of the capacitor also function as the stationary contacts of the switch mechanism, this reduces the number of soldered connections and the wiring time required. In addition the present probe and switch assembly has lower input capacitance than previous probe and switch assemblies due to the fact that the switch itself only adds about one-half of a picofarad to the input capacitance of the probe.

It is therefore one object of the present invention to provide an improved electrical probe and switch assembly.

Another object of the invention is to provide an improved electrical probe and switch assembly having low input capacitance and improved high frequency response.

A further object of the present invention is to provide an improved electrical probe and switch assembly of simplified construction, which requires fewer soldered connections and less assembly time, and is strong and reliable in operation.

Still another object of the invention is to provide an improved electrical probe and switch assembly in which a blocking capacitor inside the probe forms part of a simplified switch for changing from A.C. to D.C. operation and results in lower input capacitance.

Additional objects and advantages of the present invention will appear in the following detailed description of a preferred embodiment thereof, and in the attached drawings, of which, FIG. 1 is a perspective view of one embodiment of the electrical probe and switch assembly of the present invention;

FIG. 2 is a partial section view of FIG. 1 with parts broken away to show the internal structure of the probe and switch assembly;

Figure 3:
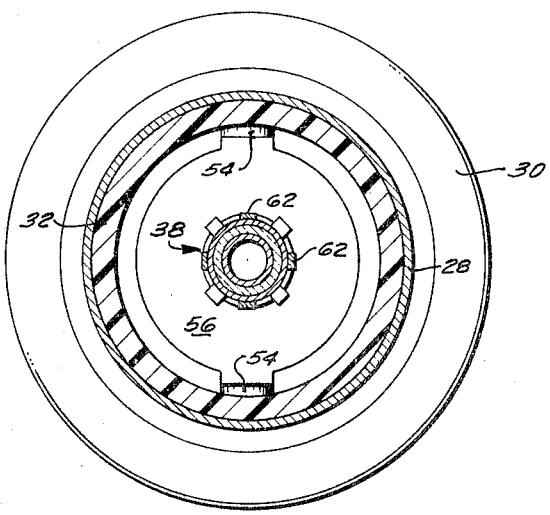
FIG. 3 is a vertical sectional view taken along the line 3—3 of FIG. 2.

The embodiment of the electrical probe and switch assembly of the present invention shown in FIG. 1 includes a probe body 10, a probe tip 12 connected to the front end of such probe body, and a two position switch mechanism 14 mounted on the probe body adjacent the probe tip. The probe tip 12 may be provided with an interchangeable metal point 16, which is screw threaded onto an inner conductor 18 mounted in the probe tip, as shown in FIG. 2. The probe body 10 includes a first outer conductor 20 in the form of a cylindrical metal sleeve suitably secured to the inner surface of a tubular plastic housing 21. An alligator clip 22 may be electrically connected to the first outer conductor by a screw 24 so that such outer conductor can be grounded in order to shield the interior of the probe from external electrical fields. The inner conductor 18 of the probe, including point 16, may be connected to the input terminal of the vertical deflection circuit of a cathode ray oscilloscope through a coaxial cable 26, suitably secured to the probe housing 10.

As shown in FIG. 2, the internal structure of the probe and switch assembly includes a second outer conductor 28 which engages the first outer conductor by a friction fit formed by clamping one end of the first outer conductor between a knob member 30 of nylon or other plastic insulating material and the second outer conductor. The second outer conductor 28 may be in the form of a cylindrical sleeve of aluminum or other metal having a portion cut away to provide an access opening 31 for easier repair and assembly of the probe. The rear end of the second outer conductor may be suitably connected to the coaxial cable 26 and the first outer conductor 20 by screw 24 or the like. The probe tip 12 includes a nose member 32 of molded plastic or other suitable insulating material having a pair of resilient finger portions 34 which extend axially of the probe body and are inserted inside the front end of the second outer conductor 28. External projections 35 on the end of such finger portions are urged into a pair of notches 36 in the second outer conductor to prevent rotation of the nose member 32 while the proper axial position of such nose member is also determined by an annular external shoulder 37 on such nose member which engages the front end of the second outer conductor.

The inner conductor 18 may be in the form of a threaded metal stud having an enlarged end portion which is soldered to a blocking capacitor 38 inside the probe body 10. The inner conductor 18 may be attached to the nose member 32 of the probe tip 12 through an axial hole in the center of such nose member by means of a threaded metal sleeve 40 suitably secured in such hole so that the inner conductor is threaded into such sleeve until its large end engages a shoulder 41 inside the nose member. A screw driver notch may be provided in the other end of the inner conductor stud 18 to allow easier insertion and retraction of such inner conductor. The metal probe point 16 may have a protective covering 42 of insulator material, extending from a point spaced from the front end of such point to the rear end thereof, adjacent the sleeve 40. This insulator covering enables the probe point to be more accurately positioned in contact with a remote test terminal without coming into contact with other parts of the circuit under test. While the probe point 16 has been shown to have a straight tip, it is interchangeable and may be of a curved type to "hook over" the circuit terminal or any other conventional probe tip.

The knob member 30 of the switch mechanism 14 in FIG. 2 is connected to a switch member 44 of nylon or other insulating material inside the probe body 10 by means of a pair of nylon screws 46 which extend through a pair of elongated slots 48 through opposite sides of the second outer conductor 28. This knob member 30 is mounted on the probe body 10 so that it makes a longitudinal sliding movement across the outer surface of the second outer conductor 28 of such probe body, between two switch positions determined by a pair of spaced, annular detent grooves 50 of V-shape cross section in the outer surface of the second outer conductor. A retaining ring 52 which is seated in an annular notch of rectangular cross section in the inner surface of the knob member 30 functions as a spring detent, by engaging one of the detent grooves 50 in each of the two switch positions of the switch mechanism 14. This spring detent retaining ring 52 may be in the form of a C-shaped leaf spring which is normally smaller than the diameter of the second outer conductor 28, so that it resultantly engages the outer surface of such conductor when the knob member 30 is moved longitudinally across the surface thereof. The ends of the slots 48 serve as stops to limit the longitudinal movement of the knob member 30 by engagement with the connecting screws 46. Switch member 44 moves with the knob member 30 since it is connected by screws 46 to such knob member, such screws engaging threaded holes in a pair of axially extending arm portions 54 which extend rearwardly from an annular ring portion 56 of the switch member. The ring portion 56 of the switch member 44 has a central opening through such ring portion through which the capacitor 38 extends. A switch contact member 60 of silver or other nonoxidizing metal is attached to the inside edge of the central opening in the ring portion 56 so that four pairs of leaf spring contacts 62 extending from both sides of the ring portion resultantly engage the outer surface of the capacitor 38, such pairs of contacts being radially spaced equidistantly about the capacitor to preserve coaxial symmetry as shown in FIG. 3.

Figure 4:
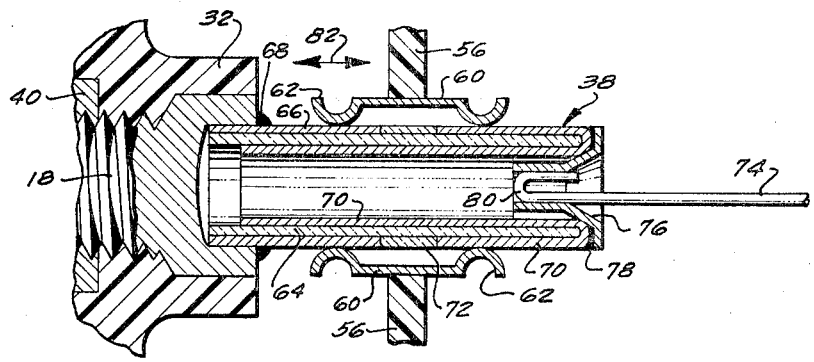
FIG. 4 is a fragmentary sectional view taken along the line 4—4 of FIG. 2.

The construction of the blocking capacitor 38 and the electrical connections thereto is shown in greater detail in FIG. 4. This capacitor may be in the form of a hollow circular cylinder 64 of ceramic dielectric material, having a first coating 66 of gold or other suitable metal forming a conducting element on the exterior surface of one end of such dielectric cylinder which is attached to the inner conductor stud 18 by a soldered connection 68. A second metal coating 70, similar to the first coating, is provided over the exterior surface of the other end of the dielectric cylinder 64 spaced from such first coating and extends over the rear edge of the cylinder and along the interior surface of such cylinder up to a point spaced from the front edge of the cylinder to provide a second conducting element.

These first and second metal coatings form the two conducting elements or plates of capacitor 38 in the region of the dielectric cylinder 64 where such coatings overlap on opposite sides of the cylinder wall. A glass coating 72 is provided over a portion of the outer surface of the dielectric cylinder 64 in the space between the first and second coatings 66 and 70, so that the outer surface of the capacitor 38 is of substantially uniform diameter to provide for ease in moving the switch contacts 62. This glass coating 72 also prevents the switch contacts 62 from wearing out due to abrasion by the ceramic material of the dielectric cylinder.

As stated above, the first metal coating 66 is connected to the inner conductor 18. The second metal coating 70 is connected to a short metal wire 74, and this wire is connected through an amplifier and computing network (not shown) which may be located inside the rear portion of housing 21, to the central conductor of the coaxial cable 26. The connection between coating 70 and wire 74 includes a funnel-shaped metal eyelet member 76 which is attached to the second metal coating by a soldered connection 78. A bent end 80 of the wire 74 is inserted into the opening of such eyelet and makes resilient contact with the eyelet. Thus the wire 74 may move slightly with reference to the eyelet 76 without varying the capacitance of capacitor 38, for example, when the cable 26 is pulled during use of the probe, but the bent end 80 of such wire maintains good electrical contact with the eyelet.

The switch mechanism 14 is shown in its A.C. switch position in FIG. 2, since the switch contacts 62 extending rearwardly of the ring portion 56 engage the glass coating 72, rather than the metal coating 70, so that the blocking capacitor 38 is effectively connected in series with the inner conductor 18 and the wire 74 to prevent the transmission of D.C. signals. However in the D.C. switch position shown in FIG. 4 the movable contacts 62 are positioned to engage both the first metal coating 66 and the second metal coating 70 to short-circuit the capacitor 38, so that D.C. signals can be transmitted from the input conductor 18 to the signal-carrying wire 74 and the coaxial cable 26. Thus, the longitudinal sliding movement of the switch contact 62 over the outer surface of the capacitor 38 in the direction indicated by arrows 82, changes the electrical connection of such capacitor so that the probe will transmit either A.C. signals only or both A.C. and D.C. signals, depending upon the detent position of knob member 30, with a minimum of signal distortion through the wire 74 to the oscilloscope.

It will be obvious to those having ordinary skill in the art that many changes may be made in the details of the above described preferred embodiment of the present invention. Therefore it is not intended to limit the scope of the present invention to the above described preferred embodiment, but that scope should only be determined by the following claims.

I claim:
1. An electrical probe and switch assembly, comprising;
   a hollow tabular probe body including an outer conductor;
   a probe tip including a first inner conductor, secured to one end of said probe body so that said first inner conductor is insulated from said outer conductor;
   a cylindrical capacitor mounted on said probe tip inside said probe body and having a pair of opposite end terminals separated by a solid dielectric portion with the input terminal electrically connected to said first inner conductor;
   a second inner conductor mounted in spaced insulated relationship within said outer conductor and electrically connected to the output terminal of said capacitor;
   switch means including a plurality of movable contacts equidistantly spaced about the capacitor and mounted for longitudinal sliding movement on the outer surface of the dielectric portion of said capacitor into and out of engagement with at least one of the terminals of said capacitor to short circuit the terminals of said capacitor; and
   knob means mounted for longitudinal sliding movement on the outer surface of said probe body and connected to said switch contacts inside said probe body for sliding said switch contacts along the surface of said capacitor between an A.C. switch position in which said capacitor is effectively connected in series with said inner conductor and a D.C. switch position in which said capacitor is short-circuited by said switch contacts.

2. An electrical probe and switch assembly, comprising:
- a hollow probe body including an outer conductor;
- a probe tip including a first inner conductor, secured to one end of said probe body so that said first inner conductor is insulated from said outer conductor;
- a cylindrical capacitor mounted coaxially on said probe tip inside said probe body and having a pair of opposite end terminals separated by a solid dielectric portion with the input terminal electrically connected to said first inner conductor;
- a second inner conductor mounted in spaced insulated relationship within said outer conductor and electrically connected to the output terminal of said capacitor;
- switch means including a plurality of movable contacts radially spaced equidistantly about the capacitor and mounted for longitudinal sliding movement on the outer surface of the dielectric portion of said capacitor into and out of engagement with at least one of the terminals of said capacitor to short circuit the terminals of said capacitor;
- knob means mounted for longitudinal sliding movement on the outside of said probe body and connected to said switch contacts inside said probe body for sliding said switch contacts along the surface of said capacitor between an A.C. switch position in which said capacitor is connected in series with said inner conductor and a D.C. switch position in which said capacitor is short-circuited by said switch contacts; and
- detent means for determining said A.C. and D.C. switch positions of said knob means.

3. An electrical probe and switch assembly, comprising:
- a hollow probe body including an outer conductor;
- a probe tip including an inner conductor, secured to one end of said probe body so that said inner conductor is insulated from said outer conductor;
- a capacitor including a cylindrical member of dielectric material having a first layer of conducting material on the outer surface of one end of dielectric member to form one plate of said capacitor, and a second layer of conducting material on the outer surface of the other end of said dielectric member spaced from said first layer to form the other plate of said capacitor, said capacitor being mounted on said probe tip inside said probe body with one of said layers being electrically connected to said inner conductor and the other of said layers adapted to be connected to a wire of an electrical cable so that said capacitor is normally connected in series with said inner conductor and said wire;
- switch means mounted inside said probe body, including a support member of insulating material and a movable contact member of conducting material attached to said support member adjacent said capacitor with a plurality of switch contacts extending from said contact member and radially spaced symmetrically about the capacitor so that said switch contacts are mounted for longitudinal sliding movement along the outer surface of said cylindrical member to enable at least one of said switch contacts to move into and out of engagement with one of said layers to change the connection of said capacitor; and knob means including a knob member mounted for longitudinal sliding movement on the outer surface of said probe body and connected to said support member inside said probe body, for moving said switch contacts on said capacitor between an A.C. switch position in which said capacitor is effectively connected in series with said inner conductor and said wire and a D.C. switch position in which said capacitor is short-circuited by said switch contacts.

4. An electrical probe and switch assembly, comprising:
- a hollow probe body including an outer conductor; a probe tip including an inner conductor, secured to one end of said probe body so that said inner conductor is insulated from said outer conductor;
- a capacitor including a hollow cylinder of dielectric material having a first coating of conducting material on the outer surface of one end of dielectric cylinder to form one plate of said capacitor, and a second coating of conducting material on the outer surface of the other end of said dielectric cylinder spaced from said first coating and extending over the inner surface of said dielectric cylinder to form the other plate of said capacitor, said capacitor being mounted on said probe tip inside said probe body with one of said coatings being electrically connected to said inner conductor and the other of said coatings adapted to be connected to a wire of an electrical cable so that said capacitor is normally connected in series with said inner conductor and said wire;
- switch means mounted inside said probe body, including a support member of insulating material having an annular ring portion surrounding said capacitor, and a movable contact member of conducting material attached to the inner edge of said ring portion with a plurality of switch contacts extending from said contact member, so that said switch contacts are mounted for longitudinal sliding movement on the outer surface of said capacitor to enable at least one of said switch contacts to move into and out of engagement with one of said coatings to change the connection of said capacitor; and
- knob means including an annular knob member mounted for longitudinal sliding movement on the outer surface of said probe body and connected to said support member inside said probe body, for moving said switch contacts on said capacitor between an A.C. switch position in which said capacitor is effectively connected in series with said inner conductor and said wire and a D.C. switch position in which said capacitor is short-circuited by said switch contacts.

5. An electrical probe and switch assembly, comprising:
- a hollow tubular probe body including an outer conductor;
- a probe tip including an inner conductor, secured to one end of said probe body so that said inner conductor is insulated from said outer conductor;
- a capacitor including a hollow cylinder of dielectric material having a first coating of conducting material on the outer surface of one end of dielectric cylinder to form one plate of said capacitor, and a second coating of conducting material on the outer surface of the other end of said dielectric cylinder spaced from said first coating and extending over the inner surface of said dielectric cylinder to form the other plate of said capacitor, said capacitor being mounted on said probe tip inside said probe body with one of said coatings electrically connected to said inner conductor and the other of said coatings adapted to be connected to the signal-carrying wire of an electrical cable so that said capacitor is normally connected in series with said inner conductor and said wire;
- switch means mounted inside said probe body, including a support member of insulating material having an annular ring portion surrounding said capacitor, and a movable contact member of conducting material attached to the inner edge of said ring portion with a plurality of resilient switch contacts extending from said contact member on both sides of said ring portion, so that said switch contacts are mounted for longitudinal sliding movement on the outer surface of said capacitor to allow the switch contacts on one side of said ring portion to move into and out of engagement with one of said coatings to change the connection of said capacitor;

knob means including an annular knob member mounted for longitudinal sliding movement on the outer surface of said probe body and connected to said support member inside said probe body, for moving said switch contacts on said capacitor between an A.C. switch position in which said capacitor is effectively connected in series with said inner conductor and said wire and a D.C. switch position in which said capacitor is short-circuited by said switch contacts; and detent means for determining the longitudinal position of said switch contacts on said capacitor in said switch positions.

6. An electrical probe and switch assembly, comprising:

a hollow tubular probe body including a cylindrical outer conductor;

a probe tip including an inner conductor, secured to one end of said probe body so that said inner conductor is coaxially mounted with said outer conductor and is insulated from said outer conductor;

a capacitor including a hollow cylinder of dielectric material having a first coating of conducting material on the outer surface of one end of dielectric cylinder to form one plate of said capacitor, and a second coating of conducting material on the outer surface of the other end of said dielectric cylinder spaced from said first coating and extending over the inner surface of said dielectric cylinder to form the other plate of said capacitor, said capacitor being mounted on said probe tip inside said probe body with one of said coatings electrically connected to said inner conductor and the other of said coatings adapted to be releasably connected to the signal-carrying wire of a coaxial cable so that capacitor is normally connected in series with said inner conductor and said wire;

switch means mounted inside said probe body, including a support member of insulating material having an annular ring portion surrounding said capacitor with a plurality of axially extending arm portions, and a movable contact member of conducting material attached to the inner edge of said ring portion with a plurality of leaf spring switch contacts extending from said contact member on both sides of said ring portion, so that said switch contacts are mounted for longitudinal sliding movement on the outer surface of said capacitor to allow the switch contacts on one side of said ring portion to move into and out of engagement with one of said coatings to change the connection of said capacitor;

knob means, including an annular knob member mounted for longitudinal sliding movement on the outer surface of said probe body and connected to said arm portions of said support member through a hole in said probe body, for moving said switch contacts on said capacitor between an A.C. switch position in which said capacitor is effectively connected in series with said inner conductor and said wire and a D.C. switch position in which said capacitor is short-circuited by said switch contacts; and detent means including a pair of spaced annular grooves in the outer surface of said probe body and a retaining ring positioned inside an annular notch in the inner surface of said knob member so that said retaining ring acts as a spring detent to engage one of said pair of grooves in said A.C. position and the other of said grooves in said D.C. position, for determining the longitudinal position of said switch contacts on said capacitor in said switch positions.

References Cited by the Examiner

UNITED STATES PATENTS

| | | | |
|---|---|---|---|
| 2,488,328 | 11/1949 | Rider | 324—72.5 X |
| 2,892,138 | 6/1959 | Stone | 317—249 |
| 3,196,217 | 7/1965 | Petrina | 324—72.5 X |

OTHER REFERENCES

Radio and TV News, Kaye, vol. 60, No. 5, November 1958, pp. 63, 119 and 120.

WALTER L. CARLSON, *Primary Examiner.*

FREDERICK M. STRADER, *Examiner.*

E. L. STOLARUN, *Assistant Examiner.*